United States Patent
Brizek

(10) Patent No.: US 7,290,104 B2
(45) Date of Patent: Oct. 30, 2007

(54) INCREASING CODE SEPARATION BETWEEN APPLICATIONS

(75) Inventor: John P. Brizek, Placerville, CA (US)

(73) Assignee: Intel Corporation, Santa Clara, CA (US)

(*) Notice: Subject to any disclaimer, the term of this patent is extended or adjusted under 35 U.S.C. 154(b) by 1556 days.

(21) Appl. No.: 09/956,209

(22) Filed: Sep. 19, 2001

(65) Prior Publication Data

US 2003/0054797 A1 Mar. 20, 2003

(51) Int. Cl.
*G06F 12/00* (2006.01)

(52) U.S. Cl. ...................................... 711/163
(58) Field of Classification Search ................ 711/163, 711/153, 173
See application file for complete search history.

(56) References Cited

U.S. PATENT DOCUMENTS

| | | | |
|---|---|---|---|
| 5,452,431 A | 9/1995 | Bournas | |
| 5,943,623 A | 8/1999 | Yehushua et al. | |
| 6,314,501 B1* | 11/2001 | Gulick et al. | 711/153 |
| 6,341,338 B1* | 1/2002 | Dennie | 711/147 |

FOREIGN PATENT DOCUMENTS

| | | |
|---|---|---|
| JP | 5-265864 | 10/1993 |
| WO | WO 01/061936 | 8/2001 |

* cited by examiner

*Primary Examiner*—Hiep T. Nguyen
(74) *Attorney, Agent, or Firm*—Trop, Pruner & Hu, P.C.

(57) ABSTRACT

A single wireless system that implements both baseband and non-baseband applications can be provided in a way that securely prevents inadvertent or deliberate alteration of protected code. For example, the possibility exists that with a common system and common storage that baseband processing code may be overwritten by non-baseband applications. By providing an address comparison register that recognizes particular addresses and ensures that those code accesses are routed only to the specific dedicated areas of storage appropriate to either base or non-baseband applications, inadvertent or deliverable overwriting can be reduced or eliminated.

20 Claims, 2 Drawing Sheets

INCREASING CODE SEPARATION BETWEEN APPLICATIONS

BACKGROUND

This invention relates generally to wireless devices and particularly to such devices that handle both wireless and non-wireless applications.

Wireless transceivers may be utilized for cellular telephone communications as well as network communications in networks of processor-based systems. Wireless systems generally include a baseband processing module that executes wireless applications. In addition, a conventional processing function may be utilized which executes applications that are not directly related to the wireless communications.

A problem arises in wireless systems because one application may overwrite instructions that are important for another application. For example, conventional non-baseband applications may overwrite critical baseband code and vice versa. Such overwriting may be the result of inadvertent coding errors or deliberate action by an intruder.

As a result, awkward accommodations must be implemented to facilitate the uneasy marriage between processors related to conventional applications and processors related to wireless applications. In some cases, special software may be utilized. In other cases, completely independent systems may be provided with very limited inter-subsystem communications. As still another alternative, separate storage may be utilized for the separate subsystems. All of these approaches may have the effect of reducing performance and increasing costs in some cases.

Thus, there is a need for a way to handle the disparate needs of the separate processing functions in a single wireless device.

DETAILED DESCRIPTION

Figure 1:
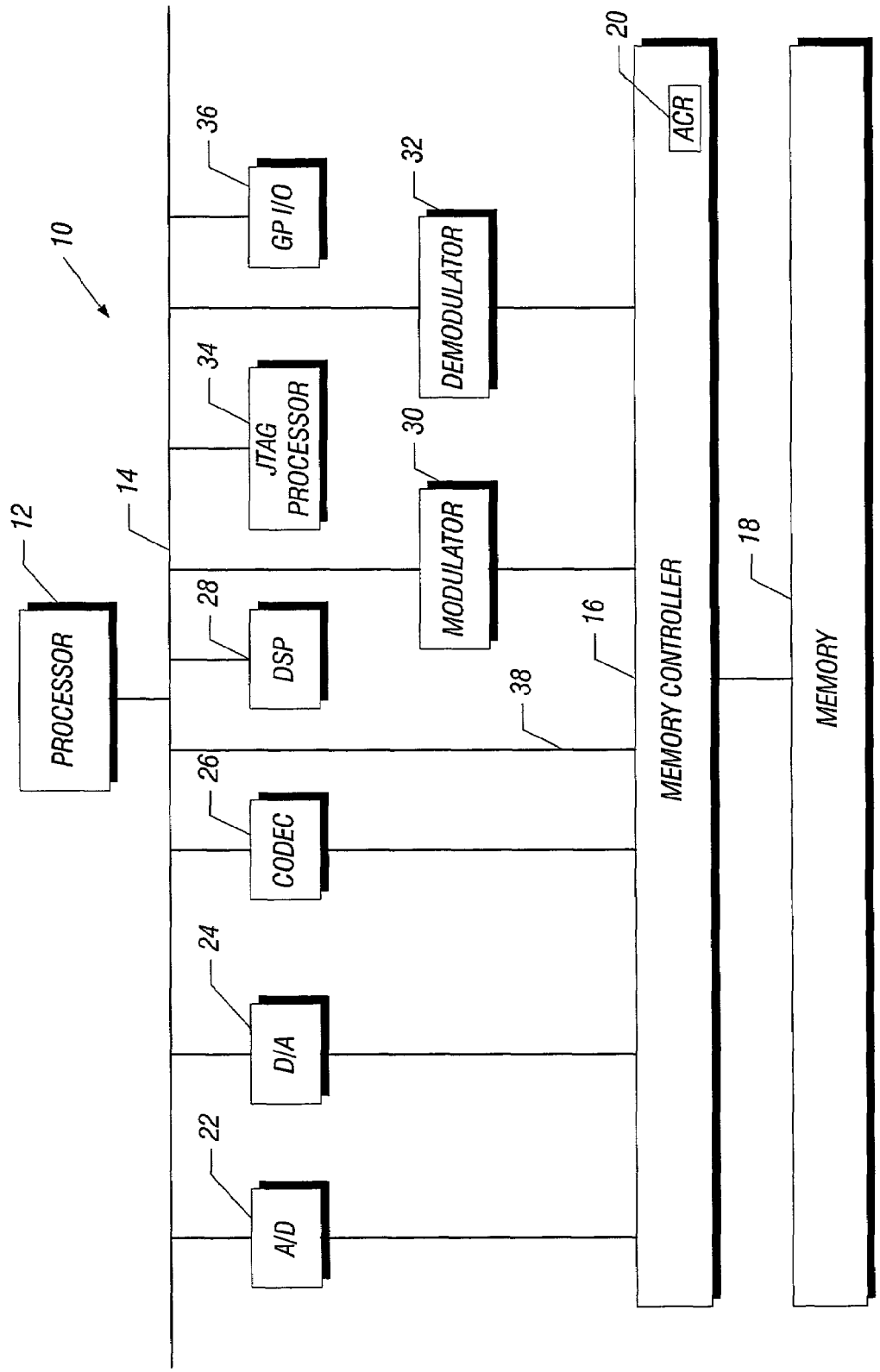
FIG. 1 is a schematic depiction of one embodiment of the present invention.

Referring to FIG. 1, a wireless device 10 may include a processor 12. The processor 12 may communicate over a bus 14 with a variety of functional units. Such units may include, in some embodiments, an analog to digital (A/D) converter 22, a digital to analog (D/A) converter 24, a coder/decoder (CODEC) 26, a digital signal processor (DSP) 28, a Joint Test Action Group (Institute of Electrical and Electronic Engineers (IEEE) Std. 1149.1-1990 IEEE Inc., New York, N.Y. (10117)) (JTAG) processor 34 and a general purpose input/output (GP I/O) device 36. In addition, the bus 14 may communicate with a modulator 30 and demodulator 32.

The aforementioned functional units may also be coupled to a memory controller 16. In addition, a bus 38 may be provided to facilitate communications between the processor 12 and the memory controller 16. The memory controller 16 may control access to a storage or memory 18.

Generally, the digital signal processor 28 may be used for signal processing. The processor 12 may execute non-baseband applications as well as baseband applications. Applications for either subsystem may be stored in the memory 18 in one embodiment.

The memory controller 16 may include an address comparison register 20. This register 20 may be utilized to determine the address range of a particular read or write instruction. Once an instruction's address range is detected, the register 20 may prevent instructions with addresses associated with one function from being deliberately or inadvertently overwritten by applications associated with another function.

Figure 2:
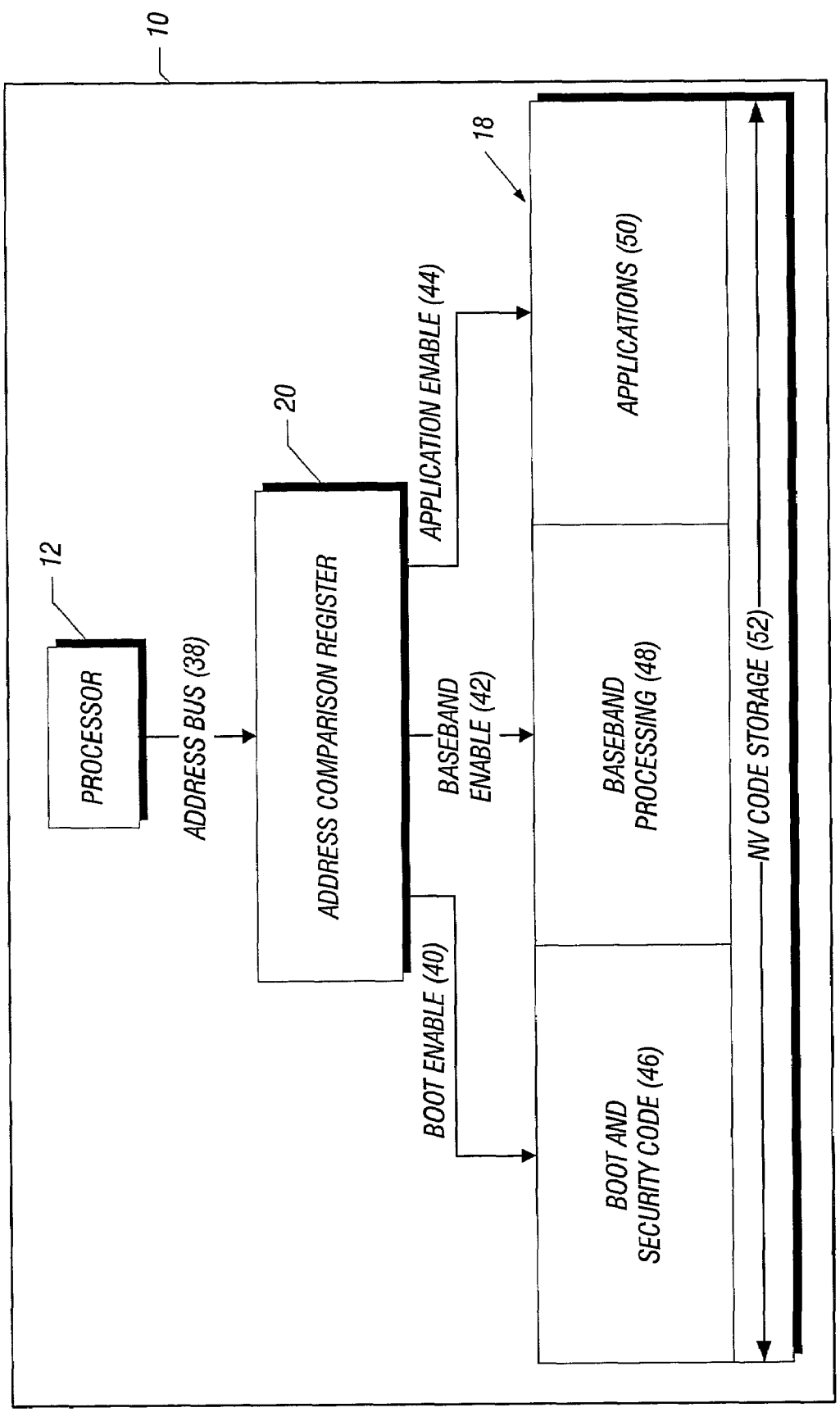
FIG. 2 is another schematic depiction of the embodiment shown in FIG. 1.

Turning to FIG. 2, the relationship between the processor 12 and the address comparison register 20 is highlighted. The address comparison register 20 may be accessed by the address bus 38. The address comparison register 20 detects the address range of the memory 18 sought to be accessed by a particular instruction. Code fetches that fall within the memory address range of a baseband processing application may be recognized as may code fetches that fall outside that range, falling instead within the address range of conventional processing applications. The address comparison register 20 allows read and write access to memory locations falling within the baseband application space for baseband processing. The register 20 also denies write access for baseband processing to the space outside that defined for baseband processing.

With respect to non-baseband or conventional processing applications, the conditions are reversed when executing code in the application space. In the application space, the register 20 allows an application to read and write data into an application memory space. However, the register 20 prevents writes to the baseband memory space.

In some embodiments, the memory 18 need not be physically segmented or separated. The memory 18 may therefore be read from or written to by all applications without restriction absent the register 20.

The address comparison register 20 decodes each address and either dedicates that address to the boot enable path 40, the baseband enable path 42 or the application enable path 44. Each enable path 40, 42 or 44 is coupled to its corresponding address space such as the boot and security code space 46, the baseband processing space 48 and the application space 50. A non-volatile code storage area 52 may also be provided.

While the memory 18 is shown as being broken up into very discrete areas, those skilled in the art will appreciate that the address space applied to any particular function may be dynamically allocated. Thus, the areas that are dedicated to particular functions may be physically dispersed within other areas dedicated to other functions. However, the overall code space dedicated to a particular function is known and is applicable by the address comparison register 20. In some embodiments the memory 18 may be a single integrated circuit or may be integrated into another device.

As a result, in some embodiments, the possibility that a non-baseband application overwrites data of a baseband application is reduced or eliminated. This avoids the need for separate baseband and conventional processing systems including separate memories in some embodiments. As a result, in some embodiments, costs may be better controlled and operating performance may be improved.

Compared to a software-based system, the use of a hardware register 20 prevents hacker attacks. The use of programmable memory management units (MMUs) enables hackers to change access rights and privileges. Code that was intended to be protected is effectively left vulnerable. By code separating access rights and privileges, enforced by hardware, access rights and privileges may not be deliberately modified by an intruder or inadvertently altered as a result of coding errors. As a result, critical and highly sensitive applications like baseband processing applications can be protected from any modification that may adversely impact their performance.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
   a processor;
   an address comparison register coupled to said processor to analyze code fetches to determine whether the code fetches relate to baseband or non-baseband applications; and
   a storage coupled to said register having storage areas dedicated to baseband and non-baseband applications.

2. The system of claim 1 wherein said register blocks code fetches relating to non-baseband applications from an area of said storage dedicated to baseband applications.

3. The system of claim 2 wherein said storage includes an area for boot and security code, an area for baseband applications and an area for non-baseband applications.

4. The system of claim 3 wherein said address comparison register prevents writes related to non-baseband applications from occurring in the storage area dedicated to baseband applications.

5. The system of claim 1 wherein said system is a wireless telephone.

6. The system of claim 1 wherein said storage includes an integrated circuit having both baseband and non-baseband application storage areas.

7. A method comprising:
   analyzing code fetches to determine whether the code fetches relate to baseband or non-baseband applications; and
   blocking said code fetches from dedicated areas of said storage based on whether said code fetches relate to baseband or non-baseband applications.

8. The method of claim 7 including analyzing the address of a code fetch to determine whether said code fetch relates to baseband or non-baseband application.

9. The method of claim 8 including blocking code fetches relating to a non-baseband application from a storage area dedicated to baseband applications.

10. The method of claim 9 including blocking code fetches not relating to boot and security code from an area of the storage dedicated to boot and security code.

11. The method of claim 8 including blocking code fetches relating to baseband applications from an area of storage dedicated to non-baseband applications.

12. The method of claim 11 including using an address comparison register to prevent writes related to non-baseband applications from occurring in a storage area dedicated to baseband applications.

13. The method of claim 7 including comparing an address of a code fetch to a set of addresses dedicated to baseband applications and based on said comparison controlling access to baseband application storage areas.

14. A computer readable medium storing instructions that enable a processor-based system to:
   analyze code fetches to determine whether the code fetches relate to baseband or non-baseband applications; and
   block said code fetches from dedicated areas of said storage based on whether said code fetches relate to baseband or non-baseband applications.

15. The medium of claim 14 further storing instructions that enable the processor-based system to analyze the address of a code fetch to determine whether said code fetch relates to a baseband or non-baseband application.

16. The medium of claim 15 further storing instructions that enable the processor-based system to block code fetches relating to non-baseband applications from a storage area dedicated to baseband applications.

17. The medium of claim 16 further storing instructions that enable the processor-based system to block code fetches not relating to boot and security code from an area of the storage dedicated to boot and security code.

18. The medium of claim 15 further storing instructions that enable the processor-based system to block code fetches not relating to baseband applications from an area of storage directed to baseband applications.

19. The medium of claim 18 further storing instructions that enable the processor-based system to use an address comparison register to prevent writes related to non-baseband applications from occurring in a storage area dedicated to baseband applications.

20. The medium of claim 14 further storing instructions that enable the processor-based system to compare an address of a code fetch to a set of addresses dedicated to baseband applications and based on said comparison control access to a baseband application storage area.

* * * * *